J. W. SPENSLEY & J. W. BATTERSBY.
MANUFACTURE OF SOLUBLE SILICATES.
APPLICATION FILED MAY 1, 1915.

1,176,613. Patented Mar. 21, 1916.

Inventors:—
Jacob William Spensley,
John William Battersby,
by
Hubert A. Gill
Attorney.

Witnesses:—
J. W. Blake
J. B. Butcher.

UNITED STATES PATENT OFFICE.

JACOB WM. SPENSLEY AND JOHN W. BATTERSBY, OF MANCHESTER, ENGLAND.

MANUFACTURE OF SOLUBLE SILICATES.

1,176,613.	Specification of Letters Patent.	Patented Mar. 21, 1916.

Application filed May 1, 1915. Serial No. 25,319.

*To all whom it may concern:*

Be it known that we, JACOB WILLIAM SPENSLEY and JOHN WILLIAM BATTERSBY, both subjects of the King of Great Britain, and residents of 29 Barton Arcade, Deansgate, Manchester, in the county of Lancaster, England, have invented certain new and useful Improvements Relating to the Manufacture of Soluble Silicates, of which the following is a specification.

This invention relates to the preparation of soluble silicates from insoluble fused or vitreous silicates of sodium and potassium, and to the preparation of useful products with the use of the soluble silicates. The fused or vitreous silicates of sodium and potassium are practically insoluble in water whether cold or heated, but they can be dissolved by being subjected to the action of steam under a pressure of about 5 atmospheres, in the presence of a considerable quantity of water at the temperature of the steam.

It is the principal object of the present invention to provide a process whereby silicates of sodium and potassium can be changed from the insoluble into the soluble form by means which will render the use of steam and of high pressures unnecessary.

A further object is to provide a process whereby soluble silicates of sodium and potassium can be produced in a dry solid or powdered form containing a relatively small percentage of water, say from 10 to 20 per cent., or a larger percentage of water up to the maximum at which a dry solid body can be obtained.

These and other objects are attained by the process hereinafter set forth.

The present invention depends upon the discovery that by the use of the grinding action exerted by hard abrasive material in the form of lumps, for instance flint pebbles, in a slowly rotating drum, it is possible to break up vitreous silicate in the presence of water into a soluble material containing a comparatively small percentage of water, which material if run out while in a fluid condition, will solidify and can be molded to any form, but can readily be powdered, and will keep in this condition until it is used.

A suitable form of the apparatus for preparing the soluble silicates is illustrated in the accompanying drawing, wherein—

Figure 1:
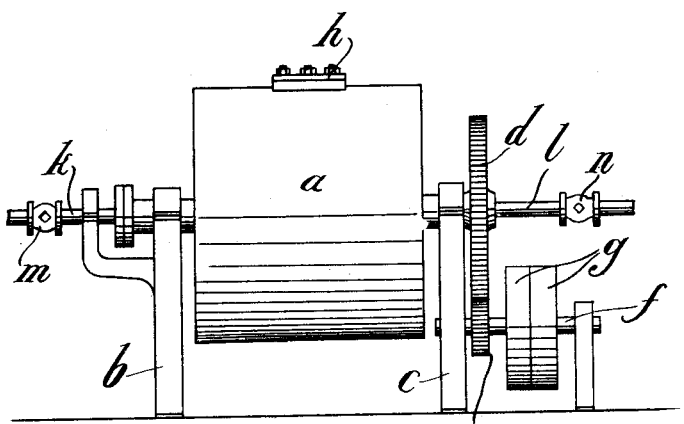
Figure 2:
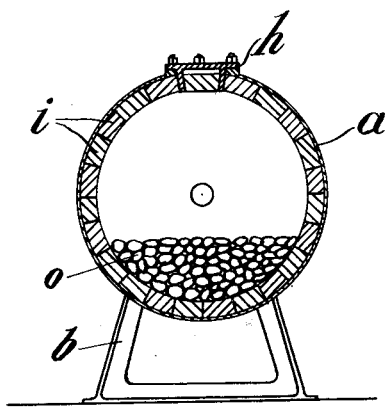

Figure 1 illustrates it in side elevation and Fig. 2 in central cross section.

The drum $a$ which may be of wrought iron, is supported in standards $b$ and $c$, and is driven for instance by a gear wheel $d$ actuated by a pinion $e$ on shaft $f$. This latter may be driven in any convenient manner as by a belt running on pulleys $g$, and receiving power from a line shaft, a motor or otherwise. The speed of driving must be slow so that the materials therein will be rolled over and over on themselves as the drum rotates. The drum is filled and emptied through a removable door $h$. The whole interior of the drum is preferably lined with blocks of porcelain, quartz or the like as indicated at $i$, although this lining is not essential if a crude product which may contain traces of the iron from the drum wall is all that is required. If the grinding operation is to take place in the presence of a gas other than air, the drum may have trunnions communicating with pipes $k$ and $l$ at its ends, through which such gas can be introduced or passed. Cocks as at $m$ and $n$ regulate the flow of the gas. In the drum is placed a charge of flint stones, quartz, artificial stone blocks or the like, or other heavy abrasive material, preferably filling about one-third of the capacity of the drum as indicated at $o$, Fig. 2. It is the abrasive action of the flints or the like $o$, on the charge of silicate glass in the presence of some water, which effects the conversion of the glass into soluble silicate as the drum is rotated, causing the materials to roll over and over therein.

In order that time may not be wasted in breaking up the silicate glass in the drum from the form of lumps, it is preferable to supply the silicate in a finer form to the drum. We have found that if the silicate glass as it flows from the furnace where it is made, is subjected to a chilling process, it is reduced to a form wherein it is particularly suitable for further treatment in the grinding drum. The chilling can be effected by allowing the molten silicate glass to fall into water when it is at once broken up into small granular pieces. The drum $a$ may conveniently be of a size to take charges from a few hundredweights up to say 5 tons or more; the silicate glass inserted for each charge may be about two-thirds the weight of the flint pebbles used. The proportions may vary considerably but these will serve as an example. A little water is placed in the drum, sufficient to make up with the silicate put in, a soluble silicate of the desired strength, containing for instance between 80 and 90 per cent. of silicate, though more water can be used if the silicate is to be prepared with a larger percentage of water. The filling aperture in the drum is closed by door h, and the drum is then driven for a few hours at a speed of say 20 or 30 revolutions per minute, but the speed will depend largely upon the size of the drum, and to some extent also on the proportion of water placed therein; the speed must not be too high or centrifugal action may tend to defeat the grinding action due to the rolling and falling over and over of the materials in the drum. No great power is required to drive the drum. After a time which may vary for instance from about 6 to 10 hours, the drum can be opened and the silicate material can be run out. This time is not to be regarded as any more than an approximate statement.

A larger drum usually grinds more quickly than a smaller one, and neutral silicate takes longer to grind than alkaline. Sodium silicate is commonly termed "neutral" if it contains 3 to 4 parts by weight of silica to one of soda, and it is called "alkaline" if it contains about 2 of silica to one of soda by weight. If the silicate when run out of the drum is in the concentrated condition mentioned above, it will still run out easily enough leaving the flint stones behind in the drum, and the material which has run out will be found to be in a pasty or semi-gelatinous condition. It will solidify into blocks on standing, these blocks being easily broken up when required into the form of a fine white powder. Silicate containing a small percentage of water solidifies more rapidly than silicate containing more water, and it is usually preferable to use the more concentrated silicate. If the silicate is "neutral", the powder prepared by breaking up the solidified hydrated silicate will not coagulate afterward, but can be sold and transported as a dry substance in sacks or otherwise as desired. It dissolves readily in cold water, or can be mixed with other substances such as common soda in any desired proportions.

When the product of the grinding operation can conveniently be dissolved in hot water, the time of grinding can be somewhat reduced, as the silicate mass is usually quite soluble in hot water, after a shorter grinding treatment.

It might be thought that an appreciable amount of the flint employed in the apparatus would be ground away and would form an impurity in the ground silicate made by our process, but this is not the case. At first, there may be as much as 1 part of flint ground up for every 200 to 300 parts of silicate, but after the apparatus has been in use for a time with the same charge of flints, the latter are scarcely used up further, and one charge of flints would last probably for a year or thereabout, before they would need to be removed and replaced. In practice it is best to add a small quantity of flints occasionally as found desirable to maintain the required quantity thereof. The flint is similar in consistency to the silicate glass which is ground up, and for many purposes the presence of some ground flint may even be an advantage, as when the product is to be used for scouring, while for other purposes when a solution of the silicate is made, it can be poured off from any insoluble residue.

When the soluble silicate is to be sold in block form it can be allowed to solidify in molds of any convenient shape. Tablets can be made like soap tablets, for use in scrubbing floors, or cleaning the hands from grease, and so forth. If the blocks are to contain any additional substances such as disinfectants or coloring matter, these can be mixed with the water in the grinding drum, when they will be thoroughly mixed with the semi-gelatinous product before it is run out and allowed to solidify.

When the product required is a powdered silicate, it is possible if the percentage of water is not large, to obtain in the grinding drum itself a product which is substantially pulverulent in form. The charge must be left in the drum after the normal period which would be required for obtaining the whole charge in a fluid condition, when it gradually solidifies and is kept in a comparatively fine condition by the continued grinding action. This would be a somewhat expensive method of manufacture, and for most purposes it will be preferable to run the material out in a liquid condition, letting it solidify and then powdering it afterward. If the apparatus is worked in a place where it is required to prepare at once a silicate solution, the fluid or semi-gelatinous mass may be run off direct from the drum into heated water so as to prepare the solution without previous solidifying of the product.

The invention is not limited to the use of a cylindrical drum made exactly as hereinbefore described, for grinding up the silicate glass, as any other suitable form of apparatus might be used wherein the glass could be subjected to a continuous grinding action, preferably effected by flints or the like falling or rolling over. A horizontally disposed cylindrical drum with flint pebbles therein appears however to be the simplest and best type of apparatus for the purpose.

The invention is not limited to the making of a soluble silicate of any particular strength or concentration in the drum, bt by adding more water in proportion to tl silicate, the product as it runs out from the drum may be made to be a silicate mass or solution of any degree of concentration or density desired.

The invention is applicable to silicates of the alkali metals, and although silicate of sodium has been referred to for the most part in the description, it is to be understood that the same process applies to silicate of potassium and to products made therefrom.

Having thus described our invention, what we claim as new and desire to secure by Letters Patent is:—

1. A process of preparing a soluble silicate of alkali metal, consisting in grinding anhydrous silicate in the presence of water, by means of a hard abrasive material.

2. A process of preparing a soluble silicate of alkali metal, consisting in grinding anhydrous silicate by means of a hard abrasive material in the form of lumps which are caused to roll over and over with the silicate, in the presence of sufficient water to form a product which is of a semi-gelatinous fluid consistency such that it can be run off from the hard abrasive substance.

3. A process of preparing a soluble silicate of alkali metal, consisting in running molten silicate into water whereby it is broken up into a granular form, charging the granular silicate into a vessel containing a solid abrasive material and some water, and causing the solid abrasive material to roll over and over in said vessel with the silicate, until the latter is converted into a soluble form with the water.

In witness whereof we have hereunto signed our names this 19th day of April 1915, in the presence of two subscribing witnesses.

JACOB WM. SPENSLEY.
JOHN W. BATTERSBY.

Witnesses:
GEORGE GREENHALGH,
HERBERT LOMAS.

Copies of this patent may be obtained for five cents each, by addressing the "Commissioner of Patents, Washington, D. C."